US006624945B2

(12) United States Patent
Fan et al.

(10) Patent No.: US 6,624,945 B2
(45) Date of Patent: Sep. 23, 2003

(54) THIN FILM FILTERS USING OMNIDIRECTIONAL REFLECTORS

(75) Inventors: Shanhui Fan, Palo Alto, CA (US); John D. Joannopoulos, Belmont, MA (US); George B. Kenney, Medfield, MA (US); Michal Lipson, Waltham, MA (US); Kevin M. Chen, Cambridge, MA (US); Lionel C Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/781,825

(22) Filed: Feb. 12, 2001

(65) Prior Publication Data

US 2002/0135877 A1 Sep. 26, 2002

(51) Int. Cl.⁷ .............................................. G02B 27/00
(52) U.S. Cl. ........................ 359/584; 359/587; 359/580; 359/578; 359/577
(58) Field of Search .................. 359/578, 579, 359/577, 580, 586, 584, 587; 356/454, 519

(56) References Cited

U.S. PATENT DOCUMENTS

| 5,452,127 | A | * | 9/1995 | Wagner | ........................ | 356/519 |
| 6,490,381 | B1 | * | 12/2002 | Adair et al. | .................... | 385/16 |
| 2002/0025130 | A1 | * | 2/2002 | Fink et al. | ................... | 385/127 |
| 2003/0087121 | A1 | * | 5/2003 | Domash et al. | .............. | 428/641 |

FOREIGN PATENT DOCUMENTS

| EP | 0 903 615 | 3/1999 |
| EP | 0 916 973 | 5/1999 |
| EP | 0 985 942 | 3/2000 |
| GB | 2 254 710 | 10/1992 |

OTHER PUBLICATIONS

"Ultra–Wide continuously tunable 1.55 micrometer vertical air–cavity filters and VCSEL's based on micromachined electrostatic actuation," Proccedings of SPIE vol. No. 4646, Photonics West, San Jose, Jan. 19–25, 2002.*
"SiO₂/TiO₂ Omnidirectional Reflector and Microcavity Resonator via the Sol–Gel Method," Chen et al. *Applied Physics Letters*. Dec. 1999. vol. 75, No. 24.

* cited by examiner

*Primary Examiner*—John Juba
*Assistant Examiner*—Fayez Assaf
(74) *Attorney, Agent, or Firm*—Samuels, Gauthier & Stevens, LLP

(57) ABSTRACT

An electromagnetic wavelength filter that allows the transmission of electromagnetic energy within a narrow range of wavelengths while reflecting incident electromagnetic energy at other wavelengths. The filter includes at least one cavity region; and at least two reflectors surrounding the at least one cavity region, at least one of the reflectors being an omni-directional reflector. The omni-directional reflector includes a structure with a surface and an index of refraction variation perpendicular to the surface, and the omni-directional reflector is specifically configured to exhibit high omni-directional reflection for a predetermined range of frequencies of incident electromagnetic energy for any angle of incidence and any polarization.

20 Claims, 13 Drawing Sheets

US 6,624,945 B2

THIN FILM FILTERS USING OMNIDIRECTIONAL REFLECTORS

BACKGROUND OF THE INVENTION

The invention relates to the field of film filters sing omnidirectional reflectors.

Thin film reflectors have been widely used in many optical applications. See, for example, H. A. Macleod, "Thin-film optical filters", second edition, (Adam Hiler Ltd, Bristol, England, 1986). Typically, such thin-film devices operate within a narrow range of angles. It has recently been discovered that a multi-layer film system can exhibit omnidirectional reflectivity, i.e., light incident upon the film within a certain frequency range, with any angle of incidence, can be completely reflected. See U.S. Pat. No. 6,130,780 entitled "High Omnidirectional Reflector" issued to Joannopoulos et al. Such technology allows the construction of thin-film reflector at much wider ranges of angles.

SUMMARY OF THE INVENTION

The invention provides a type of narrow band-pass filter. For a given wavelength, such a filter allows the transmission of light, or electromagnetic energy, at a single angle, or a small set of angles, while completely reflecting light from all other incidence angles. The invention also addresses the practical aspects regarding the use of such narrow band-pass filter for wavelength division multiplexing (WDM) applications.

The invention provides a type of thin film band-pass filter using omnidirectional reflectors. Such a filter transmits electromagnetic wave that is incident at a single incidence angle, or a small set of angles, while reflecting waves that are incident for all others angles. This filter could be important in order to perform channel add-drop functionality in wavelength division multiplexing applications.

Accordingly, the invention provides an electromagnetic wavelength filter that allows the transmission of electromagnetic energy within a narrow range of wavelengths while reflecting incident electromagnetic energy at other wavelengths. The filter includes at least one cavity region; and at least two reflectors surrounding the at least one cavity region, at least one of the reflectors being an omnidirectional reflector. The omni-directional reflector includes a structure with a surface and an index of refraction variation perpendicular to the surface, and the omni-directional reflector is specifically configured to exhibit high omni-directional reflection for a predetermined range of frequencies of incident electromagnetic energy for any angle of incidence and any polarization.

DETAILED DESCRIPTION OF THE INVENTION

Figure 1:
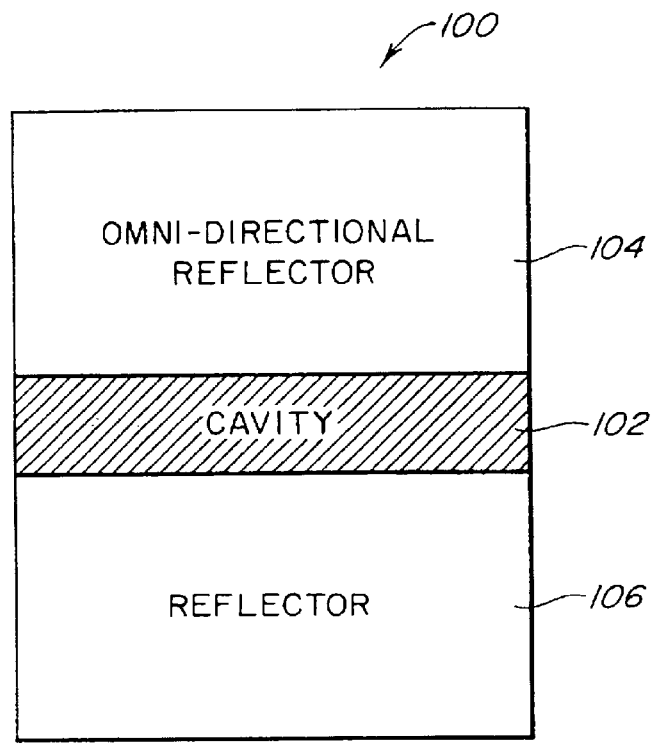
FIG. 1 is a simplified block diagram of a thin film filter using omnidirectional reflectors in accordance with the invention.

FIG. 1 is a simplified block diagram of a thin film narrow band-pass filter 100 using omnidirectional reflectors in accordance with the invention. The filter 100 includes a cavity region 102, surrounded on both sides with mirrors 104, 106. At least one of the mirrors 104 is an omnidirectional reflector, as defined in entitled "High Omnidirectional Reflector" issued to Joannopoulos et al., incorporated herein by reference in its entirety. More complicated filter configurations can be constructed by cascading these basic building blocks together.

An omnidirectional reflector is made up of a periodic arrangement of alternating layers of dielectric materials with different indices of refraction. Both the indices of the materials and the contrast between the materials have to be large enough in order for near-complete reflection of externally incident light for all incidence angles and polarizations. The presence of a cavity layer, which breaks the periodicity, supports an optical resonance that allows strong transmission of light at a narrow spectral and angular range. Thus, the filter structure as shown in FIG. 1 possess the novel characteristics of allowing the transmission of light of a particular wavelength at small ranges of angles, while completely rejecting the same light from all other incidence angles.

Figure 2:
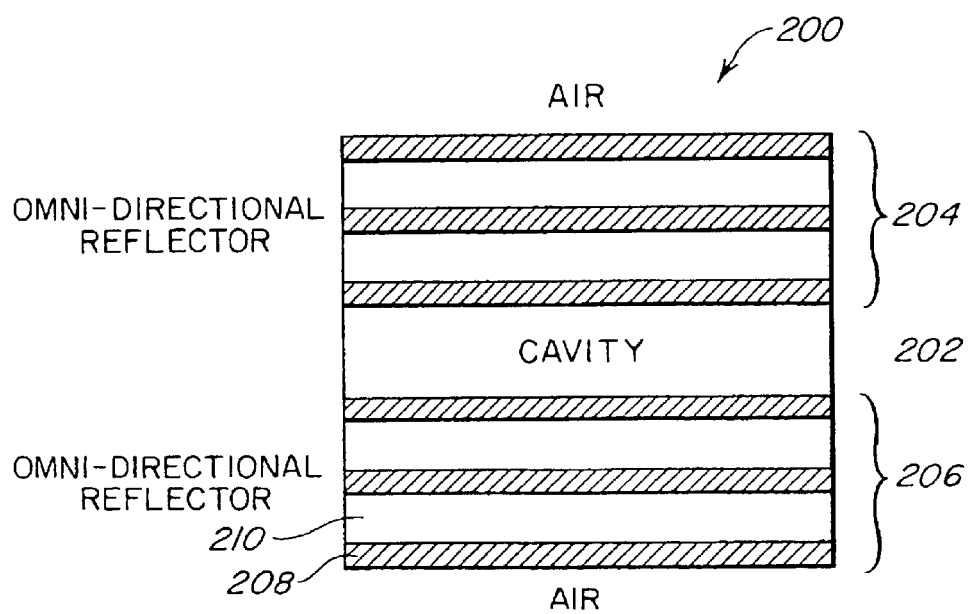
FIG. 2 is a simplified schematic block diagram of an exemplary embodiment of a thin film filter in accordance with the invention.
Figure 3A:
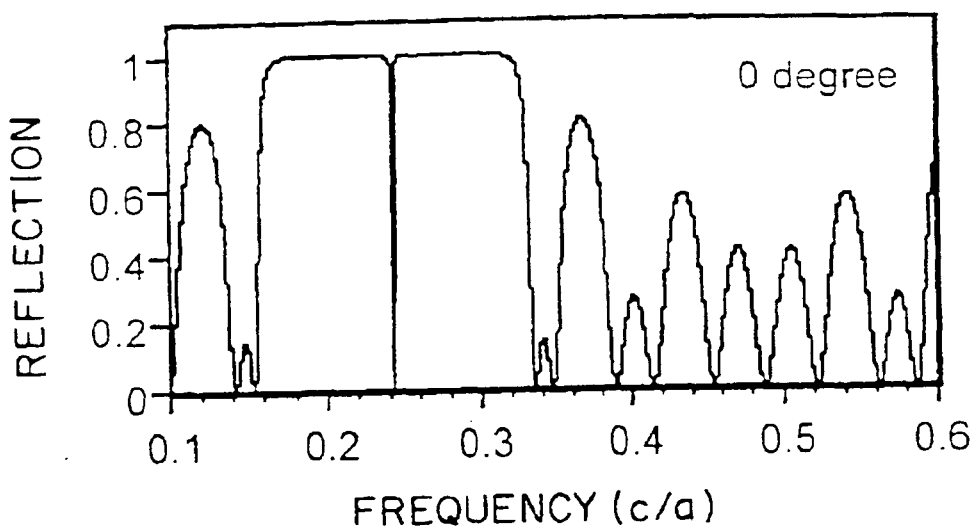
FIGS. 3A–3E are graphs showing transmission spectra of TE light for the structure as shown in FIG. 2, for calculated angles ranging from 0 to 80 degrees.
Figure 3B:
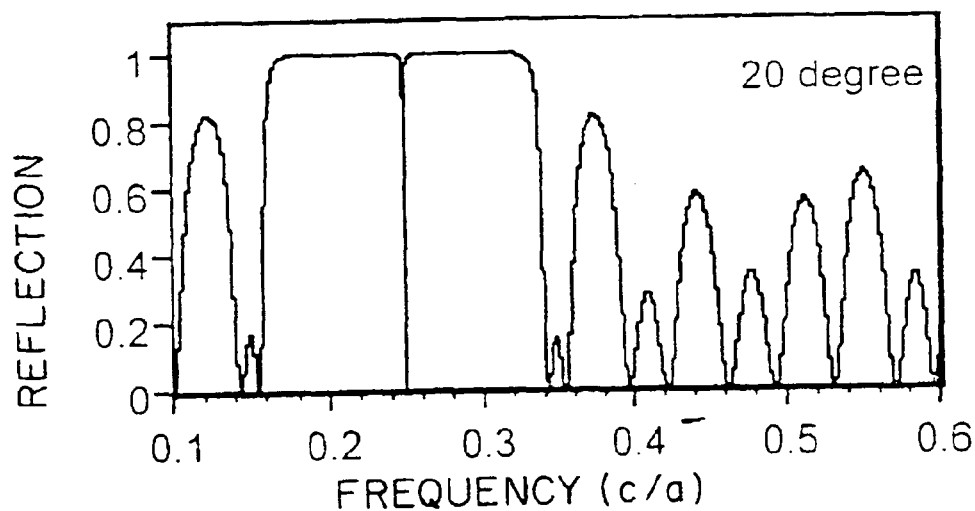
Figure 3C:
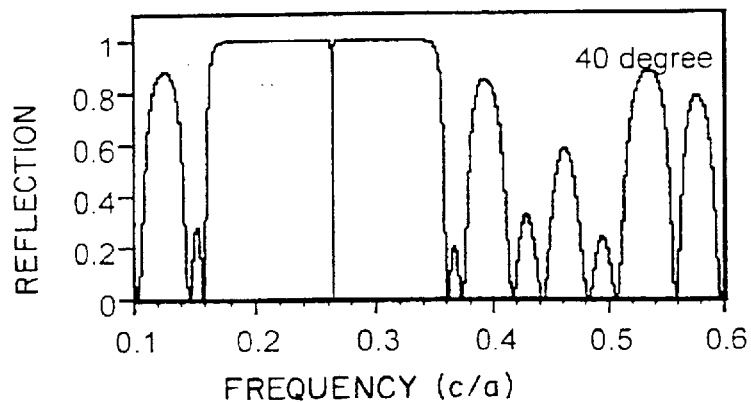
Figure 3D:
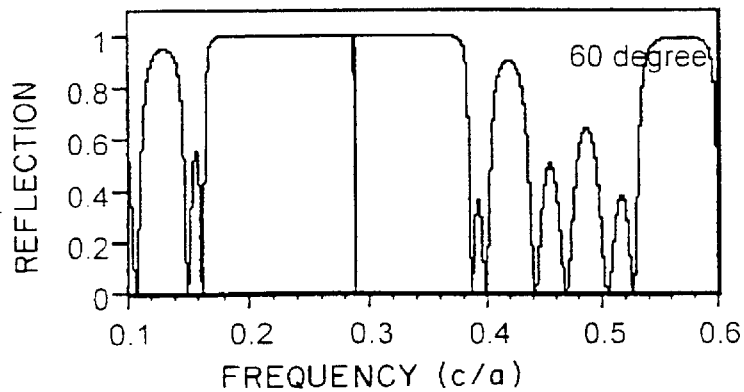
Figure 3E:
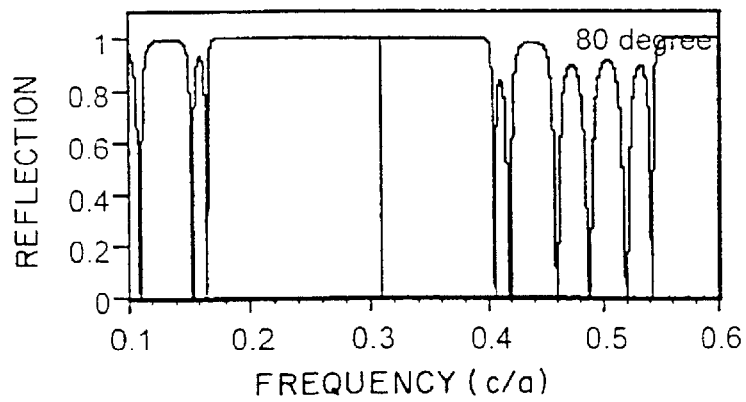
Figure 4A:
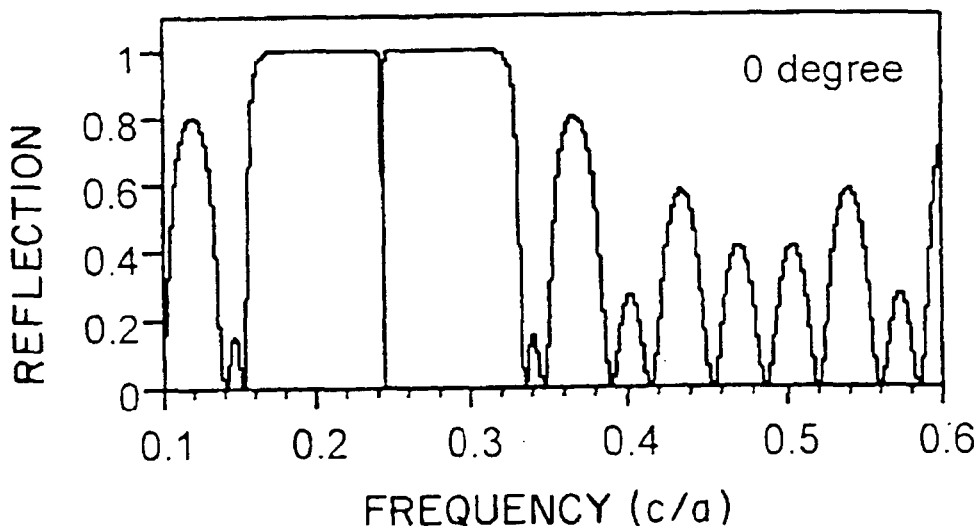
FIGS. 4A–4E are graphs showing transmission spectra of TM light for the structure as shown in FIG. 2,for calculated angles ranging from 0 to 80 degrees.
Figure 4B:
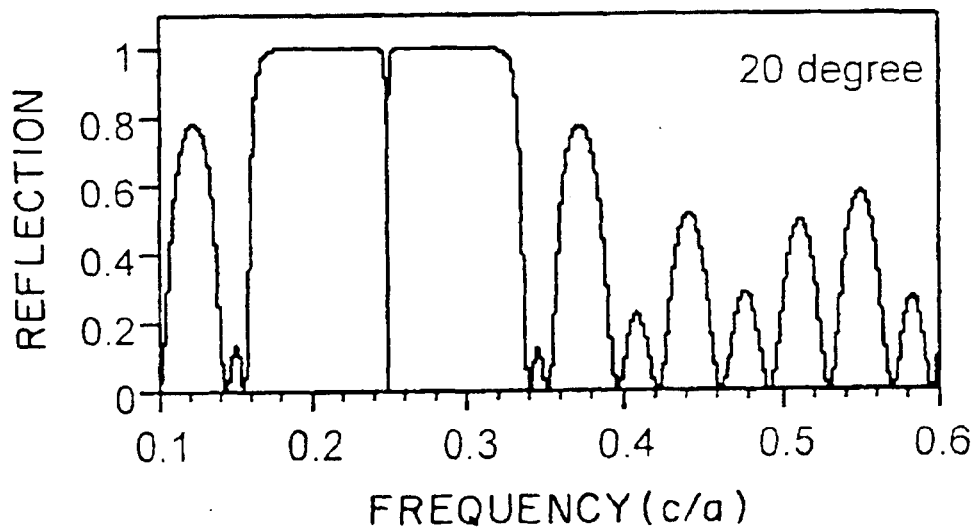
Figure 4C:
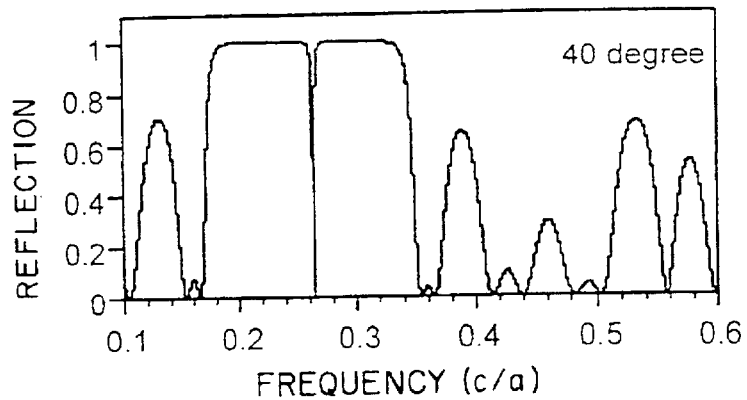
Figure 4D:
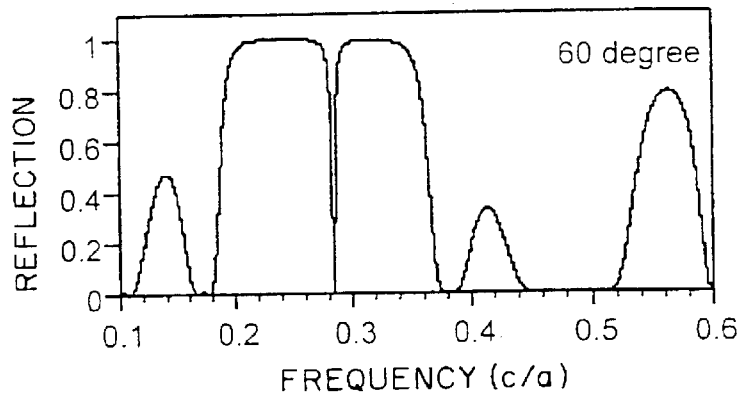
Figure 4E:
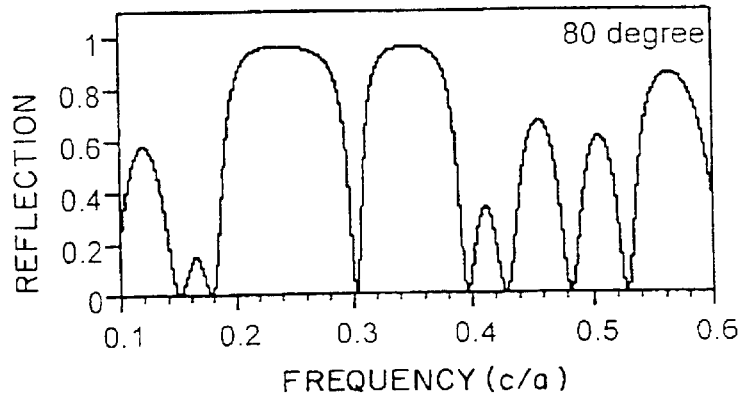

FIG. 2 is a simplified schematic block diagram of an exemplary embodiment of a thin film filter 200 in accordance with the invention. The filter 200 includes a cavity region 202 that is surrounded by omnidirectional reflectors 204, 206. The reflectors 204, 206 include alternating layers of Si 208 and $SiO_2$ 210, with an index of refraction of 3.5 and 1.5, respectively. It has been shown in U.S. Pat. No. 6,130,780 that such mirrors satisfies all the criteria for omni-directional reflectivity when external light is incident from air. Here, the thickness of the Si and $SiO_2$ layers is chosen to be 0.3a and 0.7a, respectively, where a is the period of the structure. The cavity region consists of a $SiO_2$ layer with a thickness of 1.4a.

The reflection spectra of such a device is shown in FIGS. 3A–3E for TE incident light, and FIGS. 4A–4E for TM incident light. TE light has the electric field parallel to the layers, while TM light has the magnetic field parallel to the layers. FIGS. 3A–3E are graphs showing transmission spectra of TE light for the structure as shown in FIG. 2, calculated for incidence angles ranging from 0 to 80 degrees. FIGS. 4A–4E are graphs showing transmission spectra of TM light for the structure as shown in FIG. 2, calculated for incidence angles ranging from 0 to 80 degrees.

For the TE polarization, for any particular frequency within the range of frequencies from 0.244 c/a to 0.310 c/a, incident light from any incidence direction is completely reflected, except at a single angle, where light is completely transmitted. Such angle varies as the incident frequency varies. Similar behavior also occurs for the TM polarization within the frequency range from 0.244 c/a to 0.303 c/a.

Figure 5A:
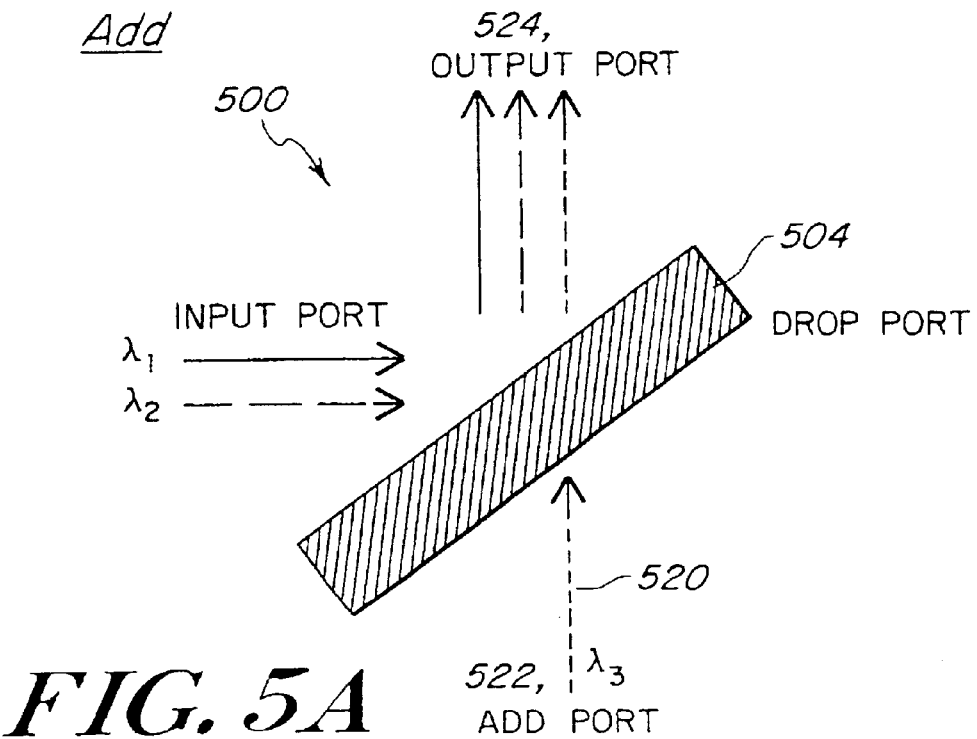
FIGS. 5A and 5B are schematic block diagrams of a WDM add and drop device, respectively, using a thin-film filter in accordance with the invention.
Figure 5B:
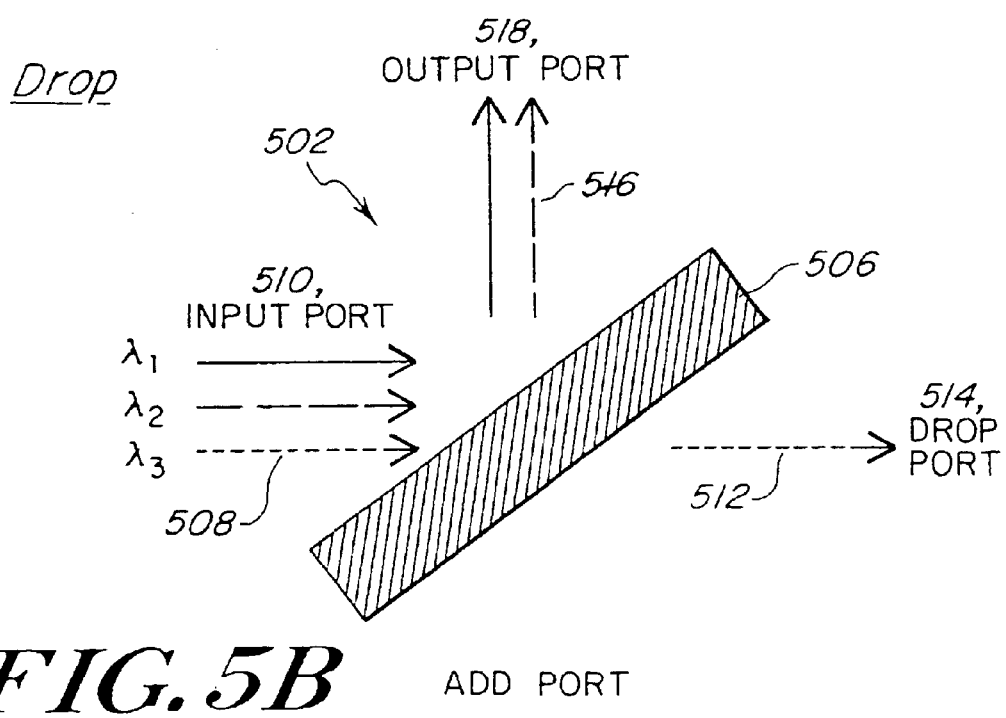

Such a device, as described above, can be particularly attractive for WDM applications. FIGS. 5A and 5B are schematic block diagrams of a WDM add 500 and drop 502 device, respectively, using thin-film filters 504, 506 in accordance with the invention. A multi-channel signal 508 is coupled into the drop device 502 from an input port 510. Among all the input channels at different frequencies, one of the channels 512 is transmitted through the multi-layer film 506 into the drop port 514, the rest 516 are completely reflected into the output port 518, resulting in the extraction of a single frequency channel from a multi-frequency data stream. The device can also be used to add a frequency by transmitting the frequency channel 520 of interest from an add port 522 to an output port 524.

Figure 6:
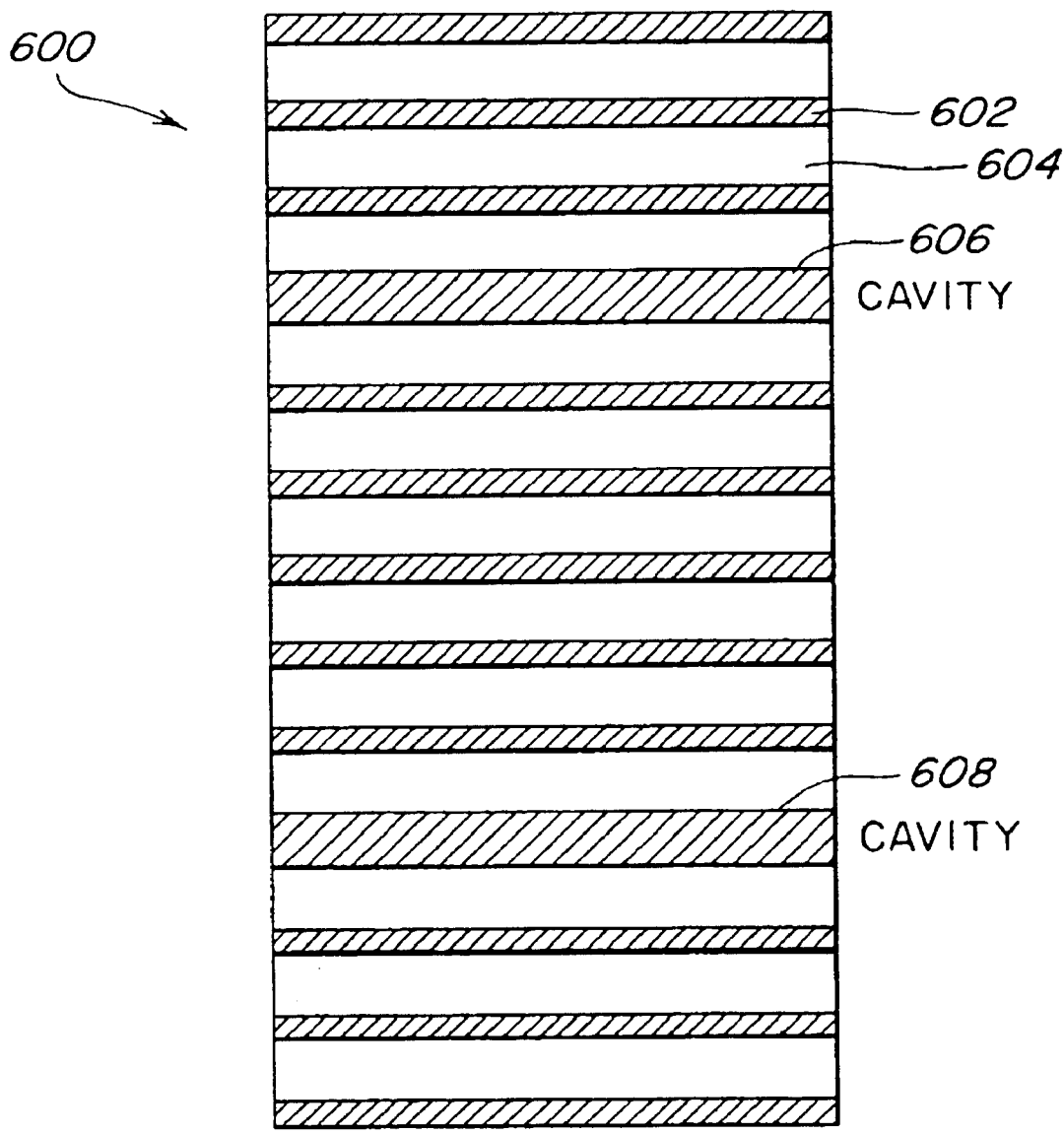
FIG. 6 is a schematic block diagram of an exemplary embodiment of a thin film filter in accordance with the invention.

FIG. 6 is a schematic block diagram of an exemplary embodiment of a thin film filter 600 in accordance with the invention. The filter 600 is a multi-layer film system, including alternating layers 602, 604 of two materials with large index contrast. A reasonable choice could be Si and $SiO_2$, which display a large enough index of refraction contrast to ensure a strong reflection at a large incidence angle. The structure is periodic in the vertical direction, except at two cavity regions 606, 608, where the periodicity of the structure is broken by increasing the film thickness.

The stop band of the filter 600 will need to cover the entire 40-channel bandwidth, which is equal to a bandwidth of 2 Thz, or roughly 1% of the carrier frequency at 193 Thz for the wavelength of light at 1.55 micron. It has already been shown that the omni-directional reflector at this index contrast can have a width of the stop band approaching 30% of the center frequency. The structure can therefore be chosen such that the optical communication bandwidth falls in the middle of the stop band, which ensures that all the channels, except for the selected channel, will be uniformly and completely reflected.

In order to achieve a narrow band-pass filter, defects are introduced into the system by increasing the thickness of single layers in an otherwise periodic arrangement to create cavities, i.e., resonators. A single defect has the effect of introducing a Lorentzian peak into the transmission spectrum T, i.e.

$$T = \frac{\gamma^2}{(\omega - \omega_0)^2 + \gamma^2}$$

where $\omega_0$ is the center frequency of the channel and $\gamma$ is the width of the transfer function.

In order to have 50 GHz channel bandwidth, the quality factor of the resonator is determined to be on the order of 4000, as estimated by taking the ratio between the carrier frequency and the channel bandwidth. Since the rejection rate of a $Si/SiO_2$ system at 45 degree of incidence is estimated to be about 6 dB/period, such a quality factor can be achieved by putting three periods, i.e., six double layers, on either side of the defect. It should also be noted that in order to achieve 100% transmission efficiency at the resonant frequency, the resonator should be symmetric. The number of layers on each side of the resonator has to be made equal.

It will be appreciated that while an exemplary embodiment that employs two materials is used for illustration purposes, the same filter response can also be synthesized with three or more materials, as long as the multilayer film enables a strong rejection at a large incidence angle. It is also preferable that the filter is polarization-independent. At the normal incidence direction, multi-layer films respond identically to the two polarizations. However, such degeneracy is broken for light incident at an oblique angle, since the rotational symmetry is no longer preserved. In particular, both the resonant frequency and the width of the resonance might be different for the two polarizations. The splitting between polarizations will depend upon the anisotropy of the materials, and the thickness and dielectric constant of the layers. Given a range of frequency of interest, all of these properties can be tuned to achieve optimal performance.

Figure 7A:
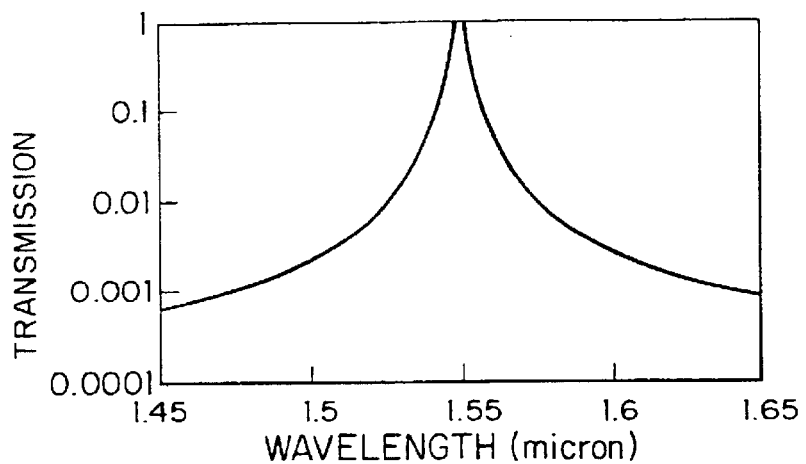
FIGS. 7A and 7B are graphs showing transmission and reflection spectra for a standard quarter-wave $Si/SiO_2$ filter at normal incidence, respectively.
Figure 7B:
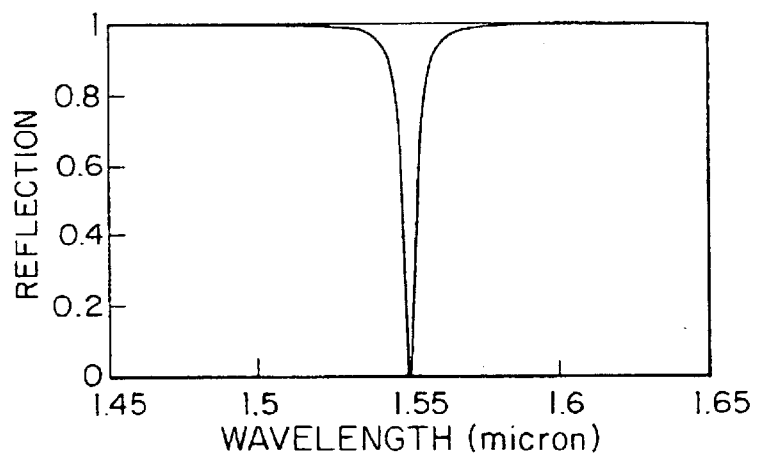

The invention provides a design procedure that will minimize the polarization dependency for the frequency and the width of the resonance. FIGS. 7A and 7B are graphs showing transmission and reflection spectra for a standard quarter-wave $Si/SiO_2$ filter at normal incidence, respectively. FIGS. 7A and 7B show the response of a one microcavity filter based on thin films of Si and $SiO_2$ which has a resonant wavelength of 1.55 micron at the normal incidence direction. The Si is assumed to possess an index of refraction of 3.5, while the $SiO_2$ is assumed to possess an index of refraction of 1.5. Here, the thickness of the Si layers is 0.3a, and the thickness of the $SiO_2$ layers is 0.7a, except the cavity layer at the center, which has a thickness of 1.4a. On each side of the center $SiO_2$ layer, there are three Si layers and two $SiO_2$ layers, i.e., the structure consists of a total of 6 bilayers.

Figure 8:
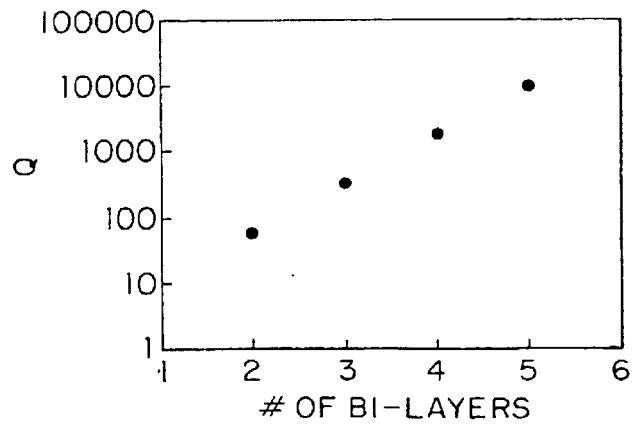
FIG. 8 is a graph of Q as a number of periods at each side of the cavity, for a standard quarter-wave $Si/SiO_2$ filter at normal incidence.

The response spectra exhibits a transmission peak at 1.55 micron when a is chosen to be 0.3691 micron. The quality factor of the resonance is 330. The quality factor of the filter can be tuned by changing the number of layers on both sides of cavity layers, as shown in FIG. 8. FIG. 8 is a graph of Q as a number of periods at each side of the cavity, for a standard quarter-wave $Si/SiO_2$ filter at normal incidence. For example, a quality factor exceeding 10,000 is achievable with a structure consists of a total of 10 bi-layers. At normal incidence angle, there is an exact degeneracy between the TE polarization, which has the electric field parallel to the film, and the TM polarization, which has the magnetic field parallel to the film, due to the rotational symmetry around the axis normal to the films.

Figure 9A:
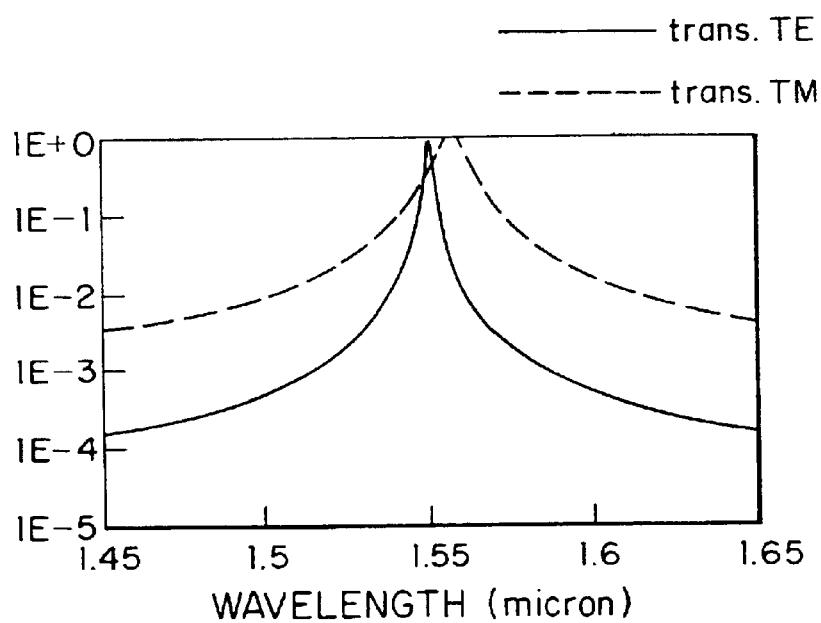
FIGS. 9A and 9B are graphs showing transmission and reflection spectra for a $Si/SiO_2$ filter for both TE and TM polarization, at 45° incidence angle, respectively.
Figure 9B:
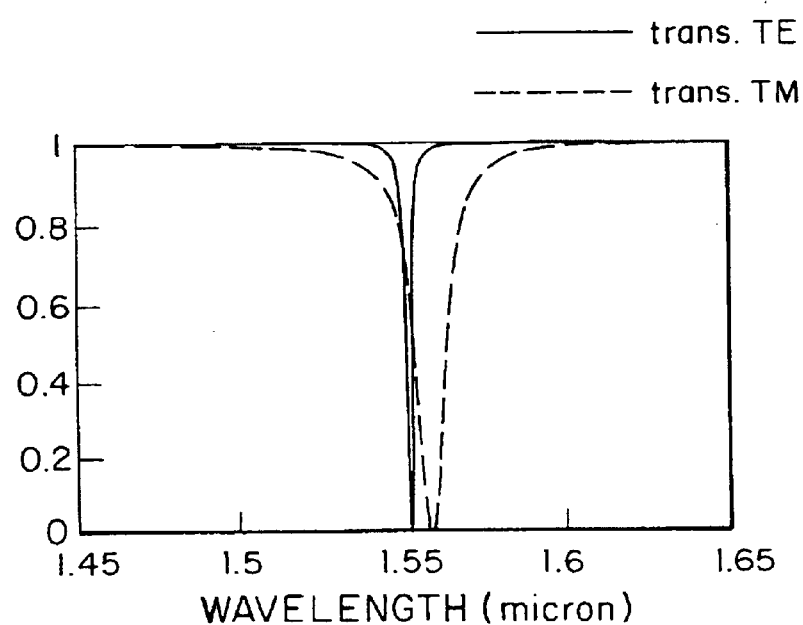

The filter as shown in FIG. 6, however, exhibits large polarization dependency in its response when light is incident at 45-degree angle. FIGS. 9A and 9B are graphs showing transmission and reflection spectra for a $Si/SiO_2$ filter for both TE and TM polarization, respectively, at 45-degree incidence angle. The Si and $SiO_2$ layer has the same relative thickness, i.e. 0.3a and 0.7a, where a is the period, except a is now chosen to be 0.4059 micron, so that the transmission still peaks at 1.55 micron from the TE polarization, with a quality factor of 698. For this filter, the TM polarization has a resonance peak at 1.5570 micron, with a quality factor of 149. Therefore, the two polarizations have different resonant frequencies and quality factors, which is undesirable.

Figure 10A:
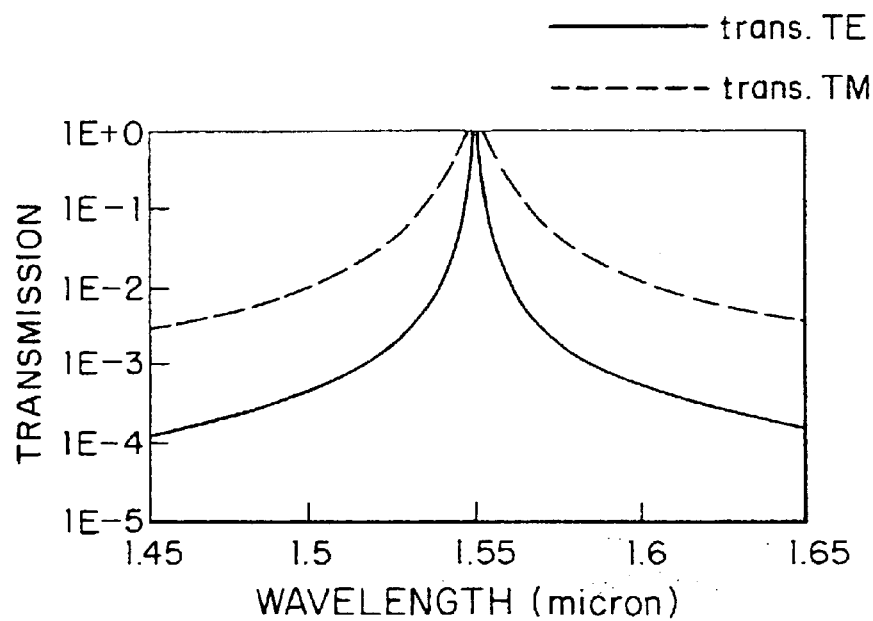
FIGS. 10A and 10B are graphs showing transmission and reflection spectra for a $Si/SiO_2$ filter for both TE and TM polarization, at 45° incidence angle, respectively.
Figure 10B:
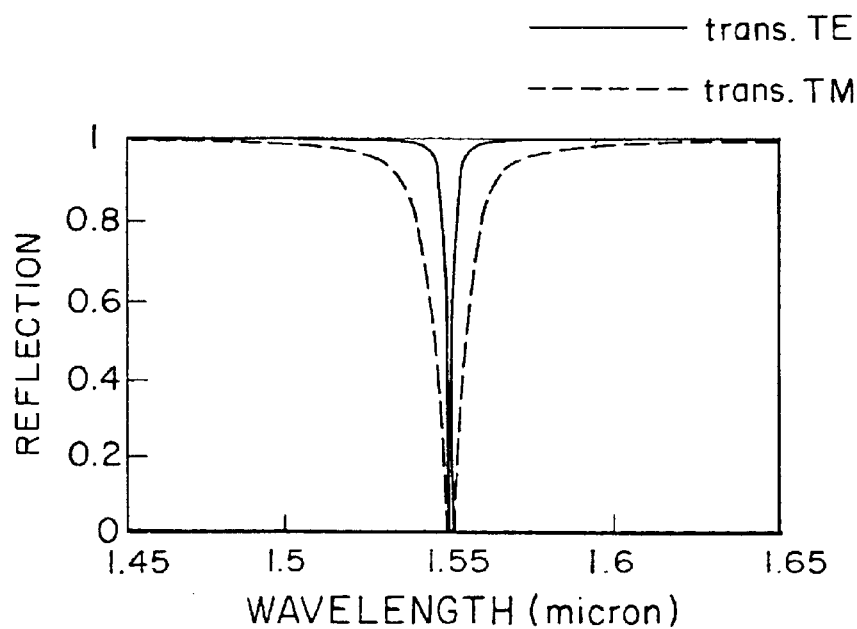

The resonant frequency of the TE and TM polarizations can actually be made the same with a judicious choice of the thickness of the layers. FIGS. 10A and 10B are graphs showing transmission and reflection spectra for a Si/SiO$_2$ filter for both TE and TM polarization, respectively. FIGS. 10A and 10B show the response spectra for a structure which exhibits no splitting between the TE and TM resonant frequency or wavelength. In this filter, the thickness of the Si layers is 0.2785a, the thickness of the SiO$_2$ layers is 0.7215a in the periodic region, and the thickness of the cavity SiO$_2$ layer is 2*0.7215a. With a chosen to be 0.40596 micron, both the TE and the TM polarization peaks at 1.55 micron, with no splitting of resonant frequency or wavelength, as desired.

In the spectra as shown in FIGS. 10A and 10B, for a structure with a total of 8 bi-layers, the TE polarization has a quality factor of 4859, while the TM polarization has a quality factor of 682. For practical WDM applications, it is also important to make the quality factor of both polarizations to be the same. The resonant frequency is determined by the spatial positions of the maximum of the fields, and is therefore sensitive only to the dielectric constant and structural parameters at positions where the electric field is strong. In other words, the resonant frequency is determined primarily by the dielectric configuration in the vicinity of the cavity region. The quality factor, on the other hand, measures the leakage of the power out of the cavity, and is therefore sensitive to dielectric configuration away from the cavity.

Figure 11:
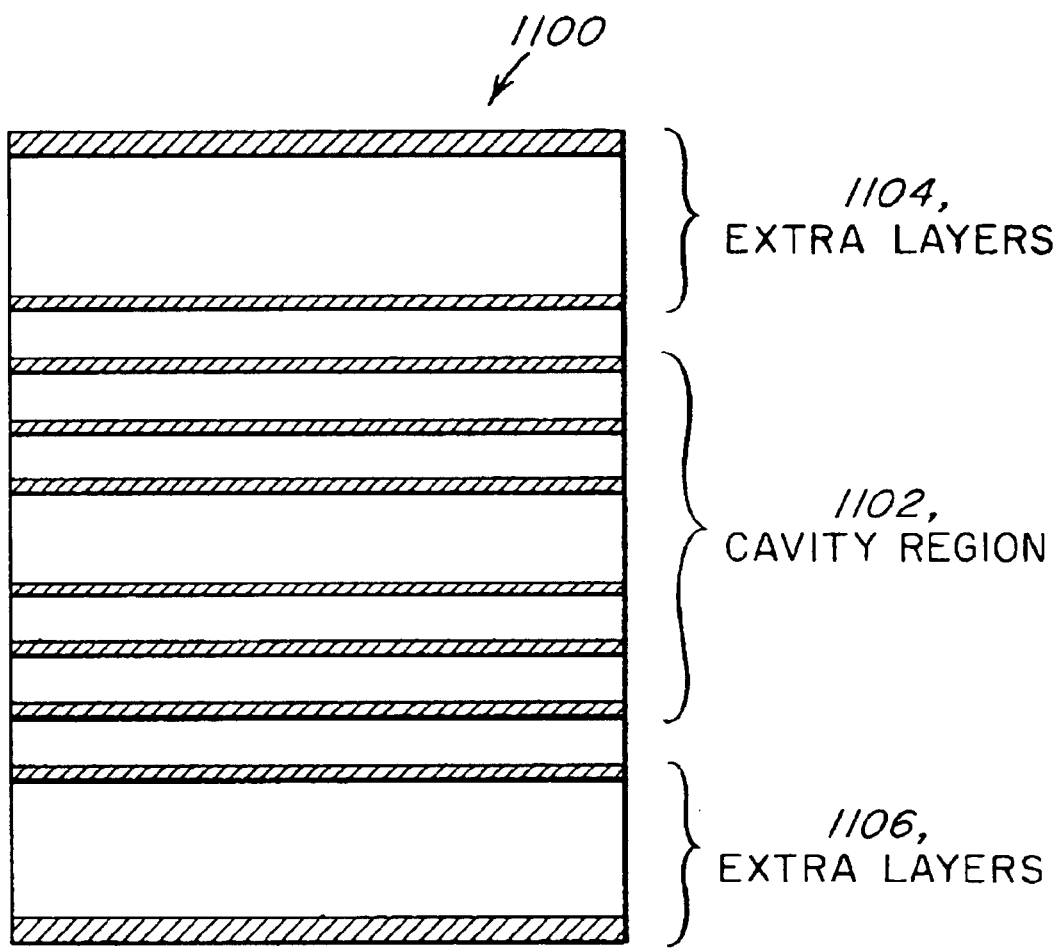
FIG. 11 is a schematic block diagram of a filter device for making the quality factor of TE and TM resonance equal.

Accordingly, the invention provides a way to make the quality factor of TE and TM modes equal, by adding extra layers to the structures, as shown in FIG. 11. FIG. 11 is a schematic block diagram of a filter device 1100 that makes the quality factor of TE and TM resonance equal. The device includes a cavity region 1102 that is surrounded by extra layer regions 1104, 1106. The extra layer regions will provide strong reflection, or feedback for the TM polarization, while allowing TE polarization to pass through, and therefore make the quality factor of TE and TM polarization to be equal. Since the fields for both polarization is primarily concentrated in the cavity region 1102, it is expected that the extra layers would not change the resonant frequency for the two polarization. Thus, it becomes possible to create a polarization independent filter at a high incidence angle.

It should be noted that having the TE and TM polarizations to have the same response characteristics is essential only if the device is intended to process both polarizations at the same time. For WDM applications, it is also possible that one might intend to deal with each polarization separately, in which case it is no longer necessary to engineer the two polarizations to have the same resonant frequency and width. While in this exemplary embodiment, the incidence angle of 45 degree is used, it will be appreciated that the same procedure can be used to eliminate polarization sensitivity at any incidence angle away from normal incidence.

More complex response functions can be achieved with the use of more cavities. For example, a fourth-order maximum flat line-shape, as defined by:

$$T = \frac{\gamma^4}{(\omega - \omega_0)^4 + \gamma^4}$$

can be achieved with the use of two defects, as shown in FIG. 6. In this case, the number of the layers between the two defects needs to be chosen to ensure that the coupling between the two cavities is comparable to the coupling between each cavity to the incoming wave. In order to do that, the number of periods between the cavities has to be approximately twice the number of periods that separates the cavity from the incident wave. Compared with a Lorentzian transmission function, such a maximum flat function has the advantage of having a flat-top response and also a sharper attenuation away from the channel frequency.

Figure 12A:
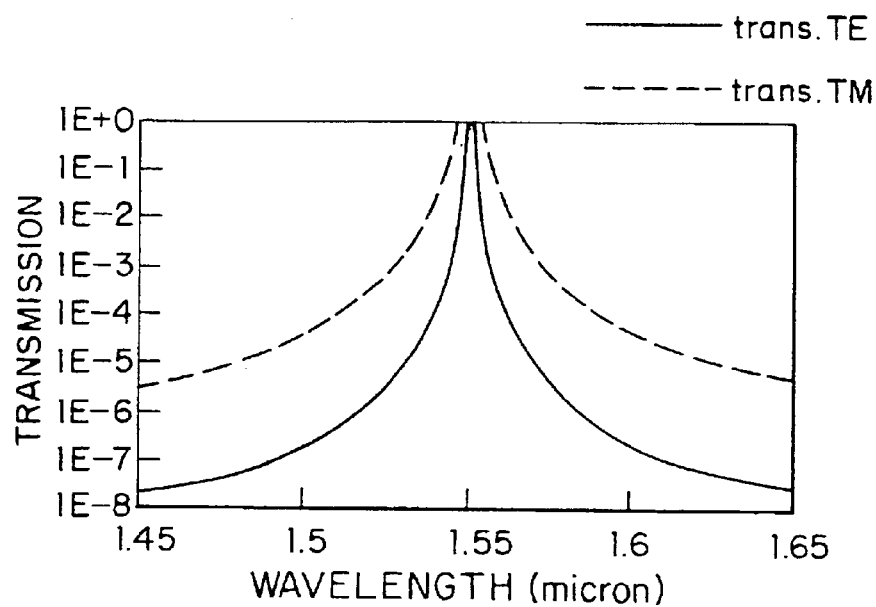
FIGS. 12A and 12B are graphs of transmission and reflection spectra for a coupled cavity system, respectively.
Figure 12B:
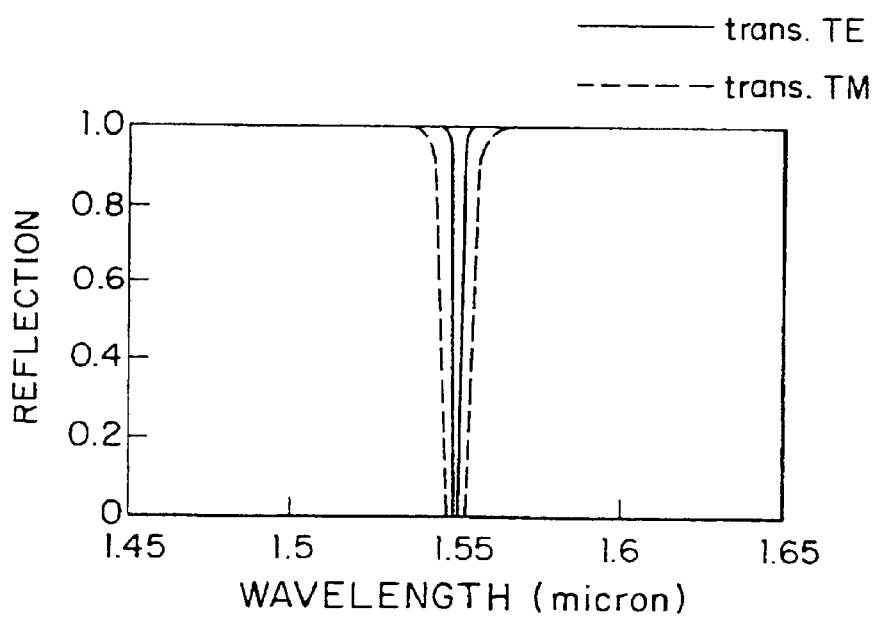

Arbitrary response line-shapes can be designed by introducing more cavities into the system, and by appropriately designing the coupling between the cavities. Such a capability will be essential in trying to satisfy the spectral requirements in actual WDM applications. FIGS. 12A and 12B are graphs of transmission and reflection spectra for a coupled cavity system, respectively, which exhibits non-Lorentzian lineshape for both the TE and the TM polarization. Compared with the Lorentzian lineshape, the top is flattened and the sides become more vertical.

The use of a muliti-cavity device for generating a better lineshape has been widely recognized in the literature. In a conventional structure with a low index of refraction contrast, however, it requires large number of layers to construct a single-cavity filter with a high quality factor. Consequently, it has been difficult to produce filters with much more than two cavities in conventional devices. The device in accordance with the invention, with the use of high-index contrast material systems, significantly reduces the number of layers required to produce a high-Q cavity, and thereby provides far more flexibility in generating complex lineshapes. In particular, the invention allows adding and dropping of a group of channels while preserving contrast with channels adjacent to the group.

In addition, the invention provides for the use of mechanical rotation as a possible mechanism to achieve frequency tunability. The resonant frequencies of the defects shift as a function of incidence angle. Therefore, small changes in the resonant frequency might be simply achieved by rotating the film slightly, i.e., by a small shift in the incidence angle. Such a rotation will not change the propagation direction of transmitted signal. The direction of the reflected light, however, changes with the rotation of the film. Since the channel bandwidth is narrow, the required rotation angle might be small enough, such that an adjustment in the output coupling setup might not be needed. Should such an adjustment become necessary, the propagation direction of the reflected light can always be corrected by the use of an extra mirror.

Figure 13A:
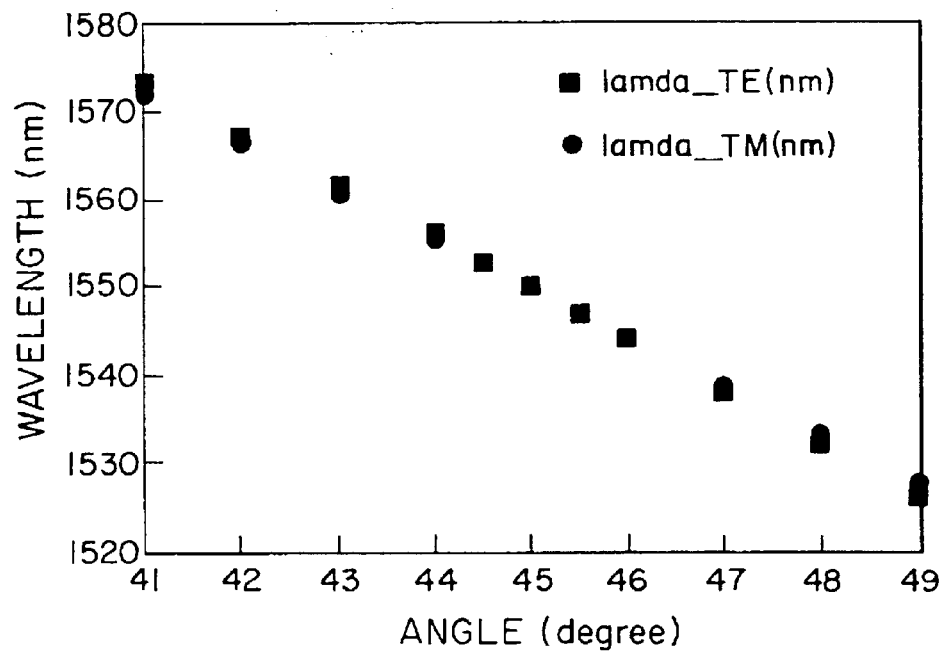
FIGS. 13A and 13B are graphs showing the effects of tuning the resonant wavelength through mechanical rotation with resonant wavelength as a function of angle, and the splitting of TE and TM resonant wavelength as a function of angle, respectively.
Figure 13B:
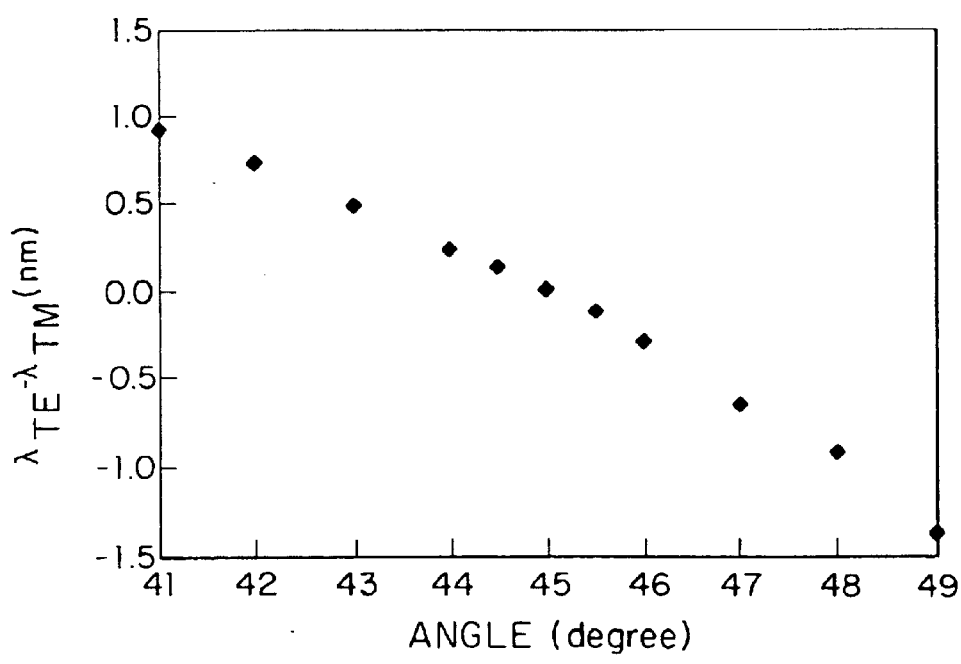

FIGS. 13A and 13B show an example of tuning by mechanical rotation, for the same structure as calculated in FIGS. 10A and 10B. FIGS. 13A and 13B are graphs showing the effects of tuning the resonant wavelength through mechanical rotation with resonant wavelength as a function of angle, and the splitting of TE and TM resonant wavelength as a function of angle, respectively.

FIG. 13A shows the tuning of the resonance as a function of angle. A change of resonant wavelength by more than 20 nm can be achieved by rotating the film by four degrees. Moreover, such rotation does not significantly degrade polarization sensitivity. FIG. 13B shows the difference in the wavelength of TE and TM polarization as a function of the incidence angle. Rotation of the film to the incidence angle of 41 degrees only causes a splitting of TE and TM wavelength of less than 1 nm.

Therefore, it is shown that mechanical rotation can be an effective way to tuning the wavelength without significantly degrading the polarization insensitivity. Also, it should be noted that since the device can function at any incident angle, this device provides a much wider range of tunability, since the incidence angle can be tuned all the way from 0 to 90 degrees. Consequently, our device facilitates a "set and forget" design, where the filter can be tuned, after fabrication, to any desired channel wavelength. Such wavelengths may be reconfigured, if needed, by simply changing the angle of incidence.

Instead of tuning the cavity by mechanical rotation, the resonant wavelength of the cavity can also be tuned using thermal or electrical effects that change the index of the structure.

Although the present invention has been shown and described with respect to several preferred embodiments thereof, various changes, omissions and additions to the form and detail thereof, may be made therein, without departing from the spirit and scope of the invention.

What is claimed is:

1. An electromagnetic wavelength filter that allows the transmission of electromagnetic energy within a narrow range of wavelengths while reflecting incident electromagnetic energy at other wavelengths, said filter comprising:

at least one cavity region; and at least two reflectors surrounding said at least one cavity region, at least one of said reflectors being an omni-directional reflector, wherein said omni-directional reflector comprises a structure with a surface and an index of refraction variation perpendicular to the surface, and said omni-directional reflector being specifically configured to exhibit high omni-directional reflection for a predetermined range of frequencies of incident electromagnetic energy for any angle of incidence and any polarization except at a predefined angle where electromagnetic energy of said narrow range of wavelengths is completely transmitted for all polarization states.

2. The filter of claim 1, wherein said narrow range of wavelengths is tuned by varying the incidence angle of the electromagnetic energy.

3. The filter of claim 2, wherein said incidence angle can be varied from 0 to 90 degrees of incidence.

4. The filter of claim 1, wherein said narrow range of wavelengths is tuned by thermal or electrical effects.

5. The filter of claim 1, wherein at a particular wavelength, said filter allows the transmission of electromagnetic energy at a single incident angle, or a small set of angles, while reflecting incident electromagnetic energy at all other incident angles.

6. The filter of claim 5, wherein said at least one narrow range of wavelengths overlaps for the TE and the TM polarizations.

7. The filter of claim 5, wherein said at least one narrow range of wavelengths exhibits similar width for the TE and the TM polarizations.

8. The filter of claim 5, wherein said at least one narrow range of wavelengths are different for the TE and the TM polarizations when said incidence angle is away from normal.

9. The filter of claim 1, wherein at an incident angle said filter allows the transmission of electromagnetic energy within at lease one narrow range of wavelengths while reflecting incident electromagnetic energy at other wavelengths.

10. The filter of claim 1, wherein said at least two reflectors comprise distributed Bragg reflector layers in the form of pairs of materials with different indices of refraction, said materials being semiconductors, conductive material oxides, glasses and glass-like oxides.

11. The filter of claim 1, wherein said filter comprises a single cavity.

12. The filter of claim 11, wherein said filter exhibits a Lorentzian transmission lineshape.

13. The filter of claim 1, wherein said filter comprises a plurality of cavities.

14. The filter of claim 13, wherein said filter exhibits a non-Lorentzian transmission lineshape.

15. The filter of claim 1, wherein said filter consists of materials with large index contrast.

16. The filter of claim 15, wherein said reflectors requires a defined number of layers to achieve a given narrow bandwidth.

17. The filter of claim 15, wherein said filter requires a defined number of layers to achieve a non-Lorentzian transmission line shape.

18. The filter of claim 15, wherein said filter comprises layers of Si and $SiO_2$.

19. A wavelength division multiplexing filter that allows the transmission of electromagnetic energy within a narrow range of wavelengths while reflecting incident electromagnetic energy at other wavelengths, said filter comprising:

a filter, including at least one cavity region, and at least two reflectors surrounding said at least one cavity region, at least one of said reflectors being an omni-directional reflector, said omni-directional reflector comprising a structure with a surface and an index of refraction variation perpendicular to the surface, said omni-directional reflector being specifically configured to exhibit high omni-directional reflection for a predetermined range of frequencies of incident electromagnetic energy for any angle of incidence and any polarization except at an angle where electromagnetic energy of said narrow range of wavelengths is completely transmitted for all polarization states;

an input port;

an output port;

an add port; and a drop port.

20. A method of filtering electromagnetic wavelengths that allows the transmission of electromagnetic energy within a narrow range of wavelengths while reflecting incident electromagnetic energy at other wavelengths, said method comprising:

providing at least one cavity region; and providing at least two reflectors surrounding said at least one cavity region, at least one of said reflectors being an omni-directional reflector, wherein said omni-directional reflector comprises a structure with a surface and an index of refraction variation perpendicular to the surface, and said omni-directional reflector being specifically configured to exhibit high omni-directional reflection for a predetermined range of frequencies of incident electromagnetic energy for any angle of incidence and any polarization except at an angle where electromagnetic energy of said narrow range of wavelengths is completely transmitted for all polarization states.

* * * * *

UNITED STATES PATENT AND TRADEMARK OFFICE
CERTIFICATE OF CORRECTION

PATENT NO. : 6,624,945 B2 Page 1 of 1
DATED : September 23, 2003
INVENTOR(S) : Fan et al.

It is certified that error appears in the above-identified patent and that said Letters Patent is hereby corrected as shown below:

<u>Column 1,</u>
Line 4, please insert the following paragraph:
-- This invention was made with government support under Grant Number DMR-9808941, awarded by NSF. The government has certain rights in the invention. --

Signed and Sealed this

Twenty-fifth Day of November, 2003

JAMES E. ROGAN
*Director of the United States Patent and Trademark Office*